US007063888B2

(12) United States Patent
Ide

(10) Patent No.: US 7,063,888 B2
(45) Date of Patent: Jun. 20, 2006

(54) IMAGE SUPPORTING MEMBER AND IMAGE FORMING APPARATUS USING THE SAME

(75) Inventor: Osamu Ide, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 275 days.

(21) Appl. No.: 10/657,117

(22) Filed: Sep. 9, 2003

(65) Prior Publication Data

US 2004/0157736 A1 Aug. 12, 2004

(30) Foreign Application Priority Data

Feb. 7, 2003 (JP) ........................... P2003-031795

(51) Int. Cl.
*B32B 5/16* (2006.01)
*B32B 23/08* (2006.01)
*B32B 27/08* (2006.01)

(52) U.S. Cl. ...................... 428/323; 428/331; 428/332; 428/336; 428/341; 428/342; 428/507; 428/511; 503/210

(58) Field of Classification Search ..................... None

See application file for complete search history.

(56) References Cited

U.S. PATENT DOCUMENTS 6,387,478 B1 * 5/2002 Fujimoto .................... 428/215

FOREIGN PATENT DOCUMENTS

| | | |
|---|---|---|
| JP | 2000-3060 | 1/2000 |
| JP | 2000-10329 | 1/2000 |
| JP | 2002-91212 | 3/2002 |

* cited by examiner

*Primary Examiner*—Monique R. Jackson
(74) *Attorney, Agent, or Firm*—Morgan, Lewis & Bockius LLP

(57) ABSTRACT

An image supporting member that fixable supports a color toner image has a base material, a light scattering layer formed on the base material and containing a white pigment and a thermoplastic resin, and a color toner receiving layer formed on the light scattering layer and containing at least a thermoplastic resin, wherein the thermoplastic resin of the light scattering layer is made of a polyolefin or a polyolefin copolymer, a temperature T at which the viscosity becomes $5\times10^3$ Pa·s being 120° C. or higher, and the thermoplastic resin of the color toner receiving layer is a polyolefin copolymer, a temperature t at which the viscosity becomes $10^3$ Pa·s being from 90 to 120° C. Further, an image forming apparatus using this image supporting member is also provided.

15 Claims, 5 Drawing Sheets

FIG. 5

| | MECHANICAL STRENGTH | HEAT RESISTANCE | GLOSS | SMOOTHNESS | OVERALL IMAGE QUALITY |
|---|---|---|---|---|---|
| EXAMPLE 1 | △ | ○ | ○ | △ | ○ |
| EXAMPLE 2 | △ | △ | ○ | ○ | ○ |
| EXAMPLE 3 | ○ | ○ | ○ | △ | △ |
| EXAMPLE 4 | △ | △ | ○ | ○ | ○ |
| EXAMPLE 5 | △ | ○ | ○ | △ | ○ |
| COMPARATIVE EXAMPLE 1 | ○ | × | ○ | × | × |
| COMPARATIVE EXAMPLE 2 | △ | ○ | △ | × | × |
| COMPARATIVE EXAMPLE 3 | △ | ○ | △ | × | △ |
| COMPARATIVE EXAMPLE 4 | ○ | ○ | × | × | × |
| COMPARATIVE EXAMPLE 5 | △ | ○ | × | × | △ |

IMAGE SUPPORTING MEMBER AND IMAGE FORMING APPARATUS USING THE SAME

BACKGROUND OF THE INVENTION

1. Field of the Invention

The present invention relates to an image supporting member used in copying machines, printers and the like. More specifically, the invention relates to improvements of an image supporting member effective for forming a color image by electrophotography or the like, a method of using the same and an image forming apparatus using the same.

2. Description of the Related Art

With respect to ordinary modes employing, for example, electrophotography, as this type of the image forming apparatus, the following image forming steps are conducted in forming a color image.

That is, illumination is applied to an original, and the reflected light is subjected to color separation with a color scanner. The colors are image-processed with an image processing device, and subjected to color compensation. Image signals of the resulting plural colors are converted into, for example, laser beams modulated with a semiconductor laser or the like according to the respective colors. The laser beams are applied to an image carrier made of an inorganic photoreceptor of Se, amorphous silicon or the like or an organic photoreceptor using a phthalocyanine pigment, a bisazo pigment or the like as a charge generating layer plural times one by one according to the respective colors to form plural electrostatic latent images. These plural electrostatic latent images are developed in order with charged toners of four colors, Y (yellow), M (magenta), C (cyan) and K (black). The developed toner images are transferred onto an image supporting member such as a paper from the image carrier made of the inorganic or organic photoreceptor, and fixed with a fixing device of a heat-pressing and fixing system. In this manner, the color images are formed on the image supporting member.

The color toner includes particles which have an average size of from 1 to 15 μm and are obtained by dispersing a colorant to a binder resin such as a polyester resin, a styrene/acrylic copolymer or a styrene/butadiene copolymer, and a fine particulate additive having an average particle size of from 5 to 100 nm and made of an inorganic material such as silicon oxide, titanium oxide or aluminum oxide or a finely divided resin of PMMA or PVDF wherein the additive is adhered to the surface of the particles.

With respect to the colorant, examples of Y (yellow) include Benzidine Yellow, Quinone Yellow and Hansa Yellow, examples of M (magenta) include Rhodamine B, Rose Bengale and Pigment Red, examples of C (cyan) include Phthalocyanine Blue, Aniline Blue and Pigment Blue, and examples of K (black) include carbon black, Aniline Black and a blend of color pigments.

As the image supporting member, a plain paper using a pulp raw material as a main component, a coat paper obtained by coating a mixture of a resin, a white pigment and the like on a plain paper, and a white film obtained by mixing a resin such as a polyester with a white pigment are used.

For example, as described in JP-A-2000-010329, JP-A-2000-003060 and JP-A-2002-091212, it is known that when forming an image with a high gloss equal to a gloss of a silver halide photographic print, an image supporting member obtained by using a plain paper, a coat paper or a white film as a base and forming thereon a layer made of a thermoplastic resin and having a predetermined thickness is preferable.

In case of a photographic print image, a thick image supporting member is generally preferable.

With respect to the transferring step, a method is known in which, for example, a transfer roll or a transfer belt made of a dielectric material or the like is previously mounted opposite to an image carrier made of a photosensitive material or the like, an image supporting member is previously attached onto the transfer roll or the transfer belt, and the transfer roll is biased or a predetermined transfer member (for example, a transfer corotron, a biased transfer roll or a biased transfer brush) is mounted on a back surface of the transfer belt, whereby an electric field having an opposite polarity to that of the charging of the toner is applied from the transfer roll or the back surface of the transfer belt to electrostatically transfer toner images on the image supporting member one by one according to the respective colors.

In the transferring step, another method is known in which, for example, a belt-shaped intermediate transfer member made of a dielectric material is mounted opposite to an image carrier made of a photosensitive material or the like, an electric field having an opposite polarity to that of the charging of the toner is applied from the back surface of the intermediate transfer member with a predetermined primary transfer member (for example, a transfer corotron, a biased transfer roll or a biased transfer brush) to transfer the toner images formed on the image carrier onto the intermediate transfer member one by one according to the respective colors and once form color toner images on the intermediate transfer member, and an electric field having an opposite polarity to that of the charging of the toner is then applied from the back surface of a substrate with a predetermined secondary transfer member (for example, a transfer corotron, a biased transfer roll or a biased transfer brush) to electrostatically transfer the color toner images onto the substrate.

In the fixing step, there is known a heat-pressing and fixing method in which heat sources such as incandescent lamps are embedded in a pair of fixing rolls which are urged against each other, and an image supporting member with color toner images transferred is passed through the pair of fixing rolls to heat-melt the color toners and fix them on the image supporting member, or a cooling-separation-fixing method in which a fixing belt with a release layer of a silicone rubber or the like formed on the surface is hanged on plural tension rolls, a pair of fixing rolls are mounted opposite to each other with the fixing belt therebetween, heat sources such as incandescent lamps are embedded in the fixing rolls, the image supporting member is passed through the pair of fixing rolls while the fixing belt is overlaid on the image supporting member with the color toner images transferred to heat-press and fix the toner images, and the fixing belt and the color toner images are separated after cooling the toner images to fix the color toner images on a substrate.

Especially when an image having a high gloss equal to a gloss of a silver halide photographic print is formed, it is known that the latter fixing method is preferable. Further, a high gloss is uniformly provided regardless of an image density, by combining the latter fixing method with the foregoing substrate having the thermoplastic resin.

This type of the image forming apparatus in which the image supporting member having the thermoplastic resin layer is used as a base gives rise to technical problems that when a white PET film or coat paper is employed, the image quality is good, but the image supporting member is quite costly, whereas when a less costly plain paper is employed, no good image quality is obtained.

When the main component of the thermoplastic resin layer is an amorphous resin such as a polyester resin, a polystyrene resin or a polyacrylic resin, such a technical problem arises that all of a low-temperature fixability, a heat resistance, a mechanical strength are not satisfied.

That is, when reduction of an amount of energy consumption in the image formation is taken into consideration, a low-temperature fixability is an indispensable subject. For satisfying the low-temperature fixability, it is effective to decrease a molecular weight of a resin and decrease a glass transition temperature.

Meanwhile, when, for example, photographs having images with a smooth surface are stored in automobiles or warehouses in summer or left in a high-temperature atmosphere in transportation on a ship bottom or the like while image top surfaces and back surfaces, image top surfaces, or image top surfaces and album materials are overlaid, a problem of blocking (photographs are adhered without separation, or separated but damaged in top surfaces) might occur.

In this case, for improving a durability at a high temperature, namely, a heat resistance, it is effective to increase a glass transition temperature and increase a molecular weight.

A toughness in folding the image, namely, improvement in mechanical strength is also an important subject. For increasing the mechanical strength, it is effective to increase a molecular weight.

Thus, the improvement in mechanical strength and heat resistance is contrary to the improvement in low-temperature fixability. Especially, in case of obtaining an image having a high gloss equal to that of a silver halide photograph, a fixing temperature has to be increased. Accordingly, it is more difficult to satisfy all of the three requirements.

Thus, the present inventors have tried to use an image supporting member in which a light diffusion layer (corresponding to a light scattering layer) obtained by dispersing 30% by weight of a white pigment such as titanium oxide in a polyolefin resin such as polyethylene is formed on a raw paper made of at least a pulp raw material and having a basis weight of from 150 to 200 g/m$^2$.

This image supporting member can be produced at relatively low cost and provide an image having a high whiteness.

In this case, however, there is a technical problem that a uniform good surface structure with a high gloss is not obtained throughout the image surface in the fixing step because a melt viscosity of the light diffusion layer on the surface of the image supporting member is high.

SUMMARY OF THE INVENTION

The invention has been made to solve the foregoing technical problems, and it provides an image supporting member which can provide a uniform structure with a high gloss throughout the image surface as in a silver halide photograph and which can easily satisfy a heat resistance, a mechanical strength and a low-temperature fixability with a fixing device having a small amount of energy consumption, a method of using the same and an image forming apparatus using the same.

That is, the invention is, as shown in FIG. 1, an image supporting member 1 that fixable supports a color toner image 4 containing at least a thermoplastic resin and a colorant, the image supporting member 1*b* having a base material 1*a*, a light scattering layer 1*b* formed on the base material 1*a* and containing a white pigment and a thermoplastic resin, and a color toner receiving layer 1*c* formed on the light scattering layer 1*b* and containing at least a thermoplastic resin, wherein the thermoplastic resin of the light scattering layer 1*b* is made of a polyolefin or a polyolefin copolymer, a temperature T at which the viscosity becomes 5×10$^3$ Pa·s being 120° C. or higher, and the thermoplastic resin of the color toner receiving layer 1*c* is a polyolefin copolymer, a temperature t at which the viscosity becomes 10$^3$ Pa·s being from 90 to 120° C.

In such a technical approach, the image supporting member 1 can have at least the light scattering layer 1*b* and the color toner receiving layer 1*c* on the base material 1*a*, and it may naturally have, as required, other layers (such as a gelatin layer and an antistatic layer).

The base material 1*a* here may be a raw paper which is commonly used in a photographic paper. As the raw paper, a paper having a basis weight of from 100 to 250 gsm is preferable in view of keeping good touch in hand.

In the light scattering layer 1*b*, it is required that the thermoplastic resin is made of a polyolefin or a polyolefin copolymer and the viscosity condition is "a temperature T at which the viscosity becomes 5×10$^3$ Pa·s being 120° C. or higher".

When this viscosity condition is satisfied, it is possible to avoid the problem that bubbles formed by water vapor generated from the base material 1*a* in the fixation impairs a smoothness of the surface of the light scattering layer 1*b*.

In the light scattering layer 1*b*, it is preferable that a white pigment is contained in an amount of from 20 to 40% by weight in view of preventing show-through and securing a mechanical strength and a flatness. It is further preferable that the thickness of the layer is from 20 to 50 μm in view of effectively preventing show-through and cracking.

In the color toner receiving layer 1*c*, it is required that the thermoplastic resin is a polyolefin copolymer, and the viscosity condition is "a temperature t at which the viscosity becomes 10$^3$ Pa·s being from 90 to 120° C.".

When this viscosity condition is satisfied, as shown in FIG. 1, the color toner image 4 is completely embedded in the color toner receiving layer 1*c*, making it possible to obtain a smooth image surface having a high gloss.

At this time, when the temperature t at which the viscosity becomes 10$^3$ Pa·s is less than 90° C., the heat resistance is poor, a problem such as blocking occurs when the layer is allowed to stand at a high temperature. Meanwhile, when it exceeds 120° C., no smooth image surface with a high gloss can be obtained by fixation. Especially, in the fixed image surface, there is a problem that a difference in height remains in an interface between a high-density area and a low-density area.

The color toner receiving layer 1*c* preferably contains a thermoplastic resin in a mixing amount of 80% by weight in consideration of a viscosity and a heat resistance. The thickness of the color toner receiving layer 1*c* is preferably from 5 to 20 μm in view of a gloss and prevention of cracking.

It is further preferable that the color toner receiving layer 1*c* contains from 3 to 15% by weight of inorganic fine particles because solidification of a resin can be accelerated after fixation.

As the inorganic fine particles, titanium dioxide or silica having a particle size of from 8 to 200 nm is preferable.

With respect to the polyolefin copolymer, it is preferable that the polyolefin copolymer is an ethylene-acrylic acid copolymer or an ethylene-acrylic ester copolymer and a copolymerization ratio of acrylic acid or an acrylic ester is from 4 to 10 mol %, in view of the adhesion and the transferability of the color toner image 4.

In the image supporting member 1, it is preferable that a reinforcing layer made of a polyolefin or a polyolefin copolymer is formed on the back surface of the base material 1*a*, in view of preventing deformation such as curling and preventing show-through.

In the image supporting member 1, it is preferable that an antistatic layer is formed on at least one of the top surface and the back surface of the image supporting member 1, in view of effectively securing stable transport or preventing adhesion of dust.

In the image supporting member 1, it is preferable that a gelatin layer is formed between the light scattering layer 1*b* and the color toner receiving layer 1*c*, in view of increasing a gloss of an image.

With respect to a method of using the image supporting member 1, it is preferable that in the thermoplastic resin of the color toner image 4, for example, a polyester resin or a styrene-acrylic resin, a temperature t' at which the viscosity becomes $10^4$ Pa·s being t±10° C., is used as a main component, in view of effectively preventing occurrence of bubbles or image disturbance (graininess deterioration, image deterioration or the like).

Moreover, the invention is directed not only to the foregoing image supporting member 1, but also to an image forming apparatus using the image supporting member 1.

In this case, the invention is an image forming apparatus including an image supporting member 1 that fixable supports a color toner image 4 containing at least a thermoplastic resin and a colorant, an image forming unit 2 that forms the color toner image 4 on the image supporting member 1, and a fixing device 3 that fixes the color toner image 4 formed by the image forming unit 2 on the image supporting member 1, the image supporting member 1 including a base material 1*a*, a light scattering layer 1*b* formed on the base material 1*a* and containing a white pigment and a thermoplastic resin, and a color toner receiving layer 1*c* formed on the light scattering layer 1*b* and containing at least a thermoplastic resin, wherein the thermoplastic resin of the light scattering layer 1*b* is made of a polyolefin or a polyolefin copolymer, a temperature T at which the viscosity becomes $5\times10^3$ Pa·s being 120° C. or higher, and the thermoplastic resin of the color toner receiving layer 1*c* is a polyolefin copolymer, a temperature t at which the viscosity becomes $10^3$ Pa·s being from 90 to 120° C.

In this image forming apparatus, the fixing device 3 has, as shown in, for example, FIG. 1, a fixing member 3*a* that nips and adheres an image G on the image supporting member 1, a heat-pressing unit 3*b* that heat-presses the color toner image 4 on the image supporting member 1 and a cooling and separating unit 3*c* that cools the heat-pressed color toner image 4 and separates the image from the fixing member 3*a*.

When the image is cooled and separated after the heat-pressing step according to this mode, the geometrical surface property of the fixing member 3*a* is directly transferred onto the image surface of the image supporting member 1. Thus, when the surface of the fixing member 3*a* is flat and smooth, a uniform and desirable image structure results.

BRIEF DESCRIPTION OF THE DRAWINGS

These and other objects and advantages of this invention will become more fully apparent from the following detailed description taken with the accompanying drawings in which:

FIG. 5 is a table showing the evaluated results of evaluating properties in Examples 1 to 5 and Comparative Examples 1 to 5.

DETAILED DESCRIPTION OF THE PREFERRED EMBODIMENTS

The invention is described in detail below by referring to an embodiment shown in the attached drawings.

Embodiment 1

Figure 1:
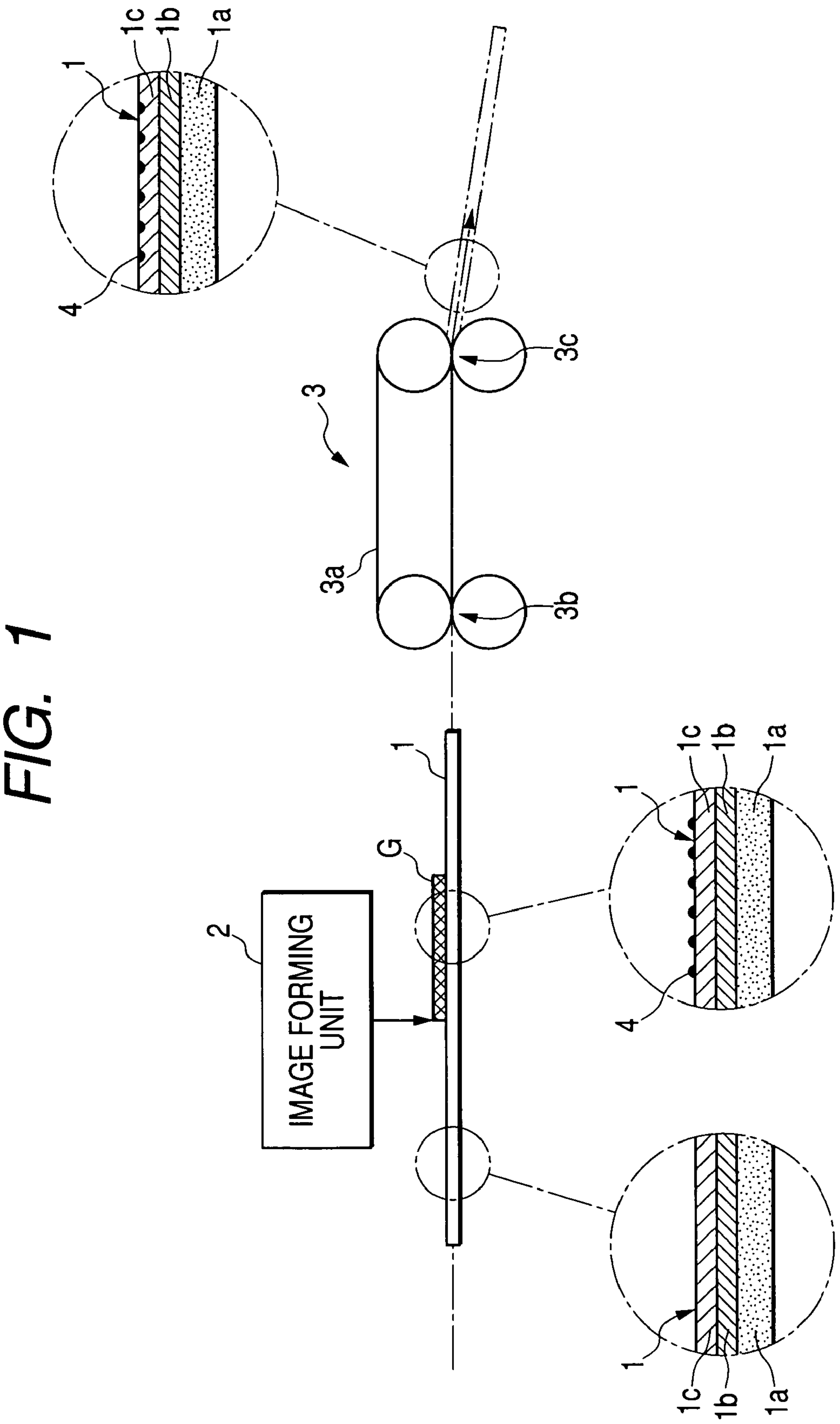
FIG. 1 is a diagrammatic view showing an image supporting member and an image forming apparatus using the same according to the invention.
Figure 2:
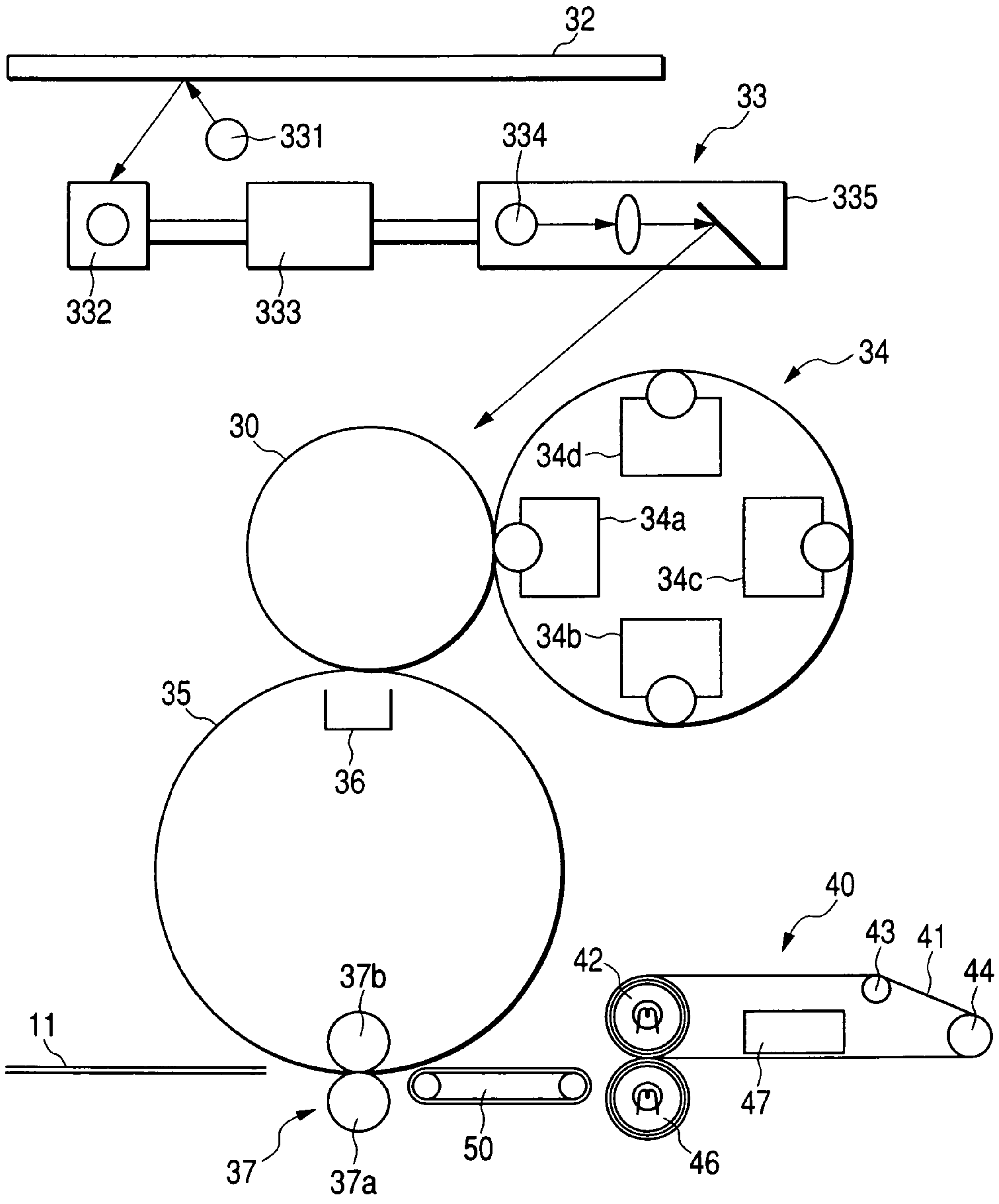
FIG. 2 is a diagrammatic view showing an overall construction of an image forming apparatus according to embodiment 1.

FIG. 2 shows embodiment 1 of a color image forming apparatus to which the invention is applied.

In FIG. 2, a color image forming apparatus according to this embodiment has an image forming unit 30 that forms color toner images 12 (refer to FIG. 4) made of, for example, yellow, magenta, cyan and black color components on the image supporting member 11, a fixing device 40 that fixes the color toner images 12 of the image supporting member 11 formed by the image forming unit 30, and a transporting device 50 that transports the image supporting member 11 to the fixing device 40.

Figure 3A:
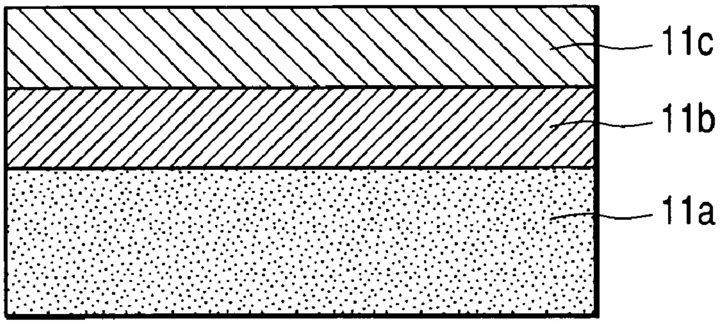
FIG. 3A is a diagrammatic view showing a cross-sectional structure of an image supporting member used in embodiment 1.

In this embodiment, in the image supporting member 11, as shown in, for example, FIG. 3A, at least a light scattering layer 11*b* with a thickness of from 20 to 50 μm made of a thermoplastic resin and containing at least a white pigment in an amount of from 20 to 40% by weight, and a color toner receiving layer 11*c* with a thickness of from 5 to 20 μm containing at least a thermoplastic resin in an amount of 80% by weight or more and formed on the light scattering layer are provided on a raw paper 11*a* having a basis weight of from 100 to 250 gsm.

The raw paper 11*a* here is selected from materials generally used in a photographic paper. That is, a natural pulp selected from a softwood and a hardwood or a synthetic pulp is used as a main raw material, and fillers such as clay, talc, calcium carbonate and urea resin fine particles, sizing agents such as rosin, alkyl ketene dimer, higher fatty acid, epoxidized fatty acid amide, paraffin wax and alkenyl succinic acid, paper strength enhancing agents such as starch, polyamide, polyamine, epichlorohydrin and polyacrylamide, and fixing agents such as aluminum sulfate and cationic polymer are added thereto as required.

The basis weight of the raw paper 11*a* is from 100 to 250 gsm. When the basis weight is deviated from this range, the touch in hand is unsatisfactory. For imparting a smoothness and a flatness, it is preferable that the raw paper 11*a* is surface-treated by applying heat and pressure with a device such as a machine calender or a supercalender.

When the light scattering layer (light diffusive layer) 11*b* is formed on the raw paper 11*a*, it is preferable that the surface of the raw paper 11*a* is previously subjected to pretreatment such as glow discharge treatment, corona discharge treatment, flame treatment or anchor coating, in view of improving an adhesion between the light scattering layer 11*b* and the raw paper 11*a*.

As the white pigment contained in the light scattering layer 11*b*, it is possible to use fine particles of known white pigments such as titanium oxide, calcium carbonate and barium sulfate. For increasing the whiteness, it is preferable to use titanium oxide as a main component.

The light scattering layer 11 contains at least the white pigment in an amount of 20 to 40% by weight.

When the amount of the white pigment is less than 20% by weight, there are problems that a whiteness is low and when, for example, characters are written or printed on the back surface, show-through occurs.

Meanwhile, when it exceeds 40% by weight, there occur problems that a mechanical strength of the light scattering layer 11*b* is insufficient and a layer having a smooth surface is hardly formed.

The thermoplastic resin contained in the light scattering layer 11*b* is made of a polyolefin or a polyolefin copolymer. Examples thereof include low-density polyethylene, high-densitypolyethylene, polypropylene, an ethylene-acrylic acid copolymer, an ethylene-acrylic acid ester copolymer and an ethylene-vinyl acetate copolymer.

It is required that the temperature T at which the viscosity of the thermoplastic resin contained in the light scattering layer 11*b* becomes $5\times10^3$ Pa·s is 120° C. or higher. When this requirement is satisfied, it is possible to avoid the problem that bubbles formed by water vapor generated from the raw paper 11*a* in the fixation impairs a smoothness of the surface of the light scattering layer 11*b*.

The thickness of the light scattering layer 11*b* in this embodiment is preferably from 20 to 50 μm.

When it is less than 20 μm, there are problems that a whiteness is low and when, for example, characters are written or printed on the back surface, show-through occurs.

Meanwhile, when it exceeds 50 μm, there is a problem that the light scattering layer 11*b* is cracked when folded.

It is advisable that a fluorescent brightener that absorbs ultraviolet light to allow fluorescence is added to the light scattering layer 11*b*. Such an image supporting member 11 can provide an image having a vivid color with a high whiteness.

A method of mixing a resin, a white pigment and other additives that form the light scattering layer 11*b* is not particularly limited so long as the purpose of uniformly dispersing the white pigment and other additives in the resin is attained.

For example, a known method such as a method in which they are directly added to an extrusion-type kneader in forming the light scattering layer 11*b* by melt extrusion or a method in which master pellets are previously formed and added to a melt extruder can be employed.

A method of forming the light scattering layer 11*b* is not particularly limited so long as the uniform, smooth light scattering layer 11*b* can be formed.

For example, a device based on a melt extrusion method in which a white pigment and other additives are also uniformly dispersed in a resin is mentioned. The melt extrusion method includes a laminating method in which a molten resin film extruded from a heated extruder via a wide slit die (so-called T-die) is contacted with the raw paper 11*a* and continuously pressed with a roll and a general method in which a molten resin is extruded on a cooling roll and wound to form a film.

The melt extrusion method can easily form a uniform film made of the resin, the white pigment and other additives on the raw paper 11*a*.

The extruder used to form the light scattering layer 11*b* by the melt extrusion method may be a single screw extruder or a twin-screw extruder. In this case, it is important that the extruder has an ability to uniformly mix the resin with the white pigment and other additives.

In the formation of the light scattering layer 11*b*, it is advisable that one surface or both surfaces of the molten resin film extruded via the slit die (so-called T-die) is treated by a method such as flame treatment, corona treatment or plasma treatment.

This treatment can improve an adhesion between the raw paper 11*a* and the color toner receiving layer 11*c*.

In this embodiment, the image supporting member 11 has the color toner receiving layer 11*c* on the light scattering layer 11*b*.

The thermoplastic resin of the color toner receiving layer 11*c* is made of a polyolefin copolymer. Examples thereof include an ethylene-acrylic acid copolymer, an ethylene-acrylic ester copolymer, an ethylene-vinyl acetate copolymer and an ethylene-norbornene copolymer.

In view of an adhesion and a transferability of the color toner image 12 (refer to FIG. 4), an ethylene-acrylic acid copolymer or an ethylene-acrylic acid ester copolymer is preferable. In view of the heat resistance, a copolymerization ratio of acrylic acid or an acrylic acid ester relative to ethylene is preferably from 4 to 10 mol %.

When it is less than 4 mol %, there occur the following problems the adhesion to the color toner is poor, a transferability of the color toner is poor, a fixing temperature is increased, and it takes much time to completely solidify the layer 11*a* after fixation that the smoothness of the surface is worsened when the surface is touched by hand before solidification or another matter is pushed thereagainst.

Meanwhile, when it exceeds 10 mol %, the heat resistance is decreased, which causes blocking during storage under a high temperature condition.

It is further advisable to add, besides the thermoplastic resin, wax, inorganic fine particles, organic fine particles and the like to the color toner receiving layer 11*c*.

It is preferable that the thermoplastic resin is used in an amount of 80% by weight or more. When the amount is less than 80% by weight, there might occur problems that the viscosity is increased and the heat resistance is decreased.

It is especially preferable that the inorganic fine particles are added in an amount of from 3 to 15% by weight.

The inorganic fine particles are not particularly limited unless a whiteness is impaired, and can properly be selected from known fine particles according to the purpose. Examples of the material thereof include silica, titanium dioxide, barium sulfate and calcium carbonate. In consideration of the dispersibility in the resin, the inorganic fine particles which are hydrophobized with a silane coupling agent, a titanium coupling agent or the like are also available.

The average particle size of the inorganic fine particles is preferably from 0.005 to 1 μm. When the average particle size is less than 0.005 μm, agglomeration might occur when mixing the particles with the resin, so that no desired effect is provided. Meanwhile, when it exceeds 1 μm, an image having a higher gloss is hardly obtained.

The addition of the inorganic fine particles expedites the solidification of the resin after the fixation.

When the amount of the inorganic fine particles is less than 3% by weight, there is almost no effect of expediting solidification. When it exceeds 15% by weight, the viscosity at the fixing temperature is increased, so that no image surface having a high gloss can be formed at a desired fixing temperature.

The main component of the inorganic fine particles is preferably titanium dioxide or silica having a particle size of from 8 to 200 nm. Such inorganic fine particles do not impair the whiteness, and can expedite solidification even in the small amount.

The addition of the organic fine particles can also expedite the solidification of the resin after the fixation.

The organic fine particles are not particularly limited unless the whiteness is impaired, and can properly be selected from known fine particles according to the purpose. Examples of the material thereof include a polyester resin, a polystyrene resin, talc, kaolin clay, a polyacrylic resin, a vinyl resin, a polycarbonate resin, a polyamide resin, a polyimide resin, an epoxy resin, a polyurea resin and a fluororesin.

The average particle size of the organic fine particles is preferably from 0.005 to 1 μm. When the average particle size is less than 0.005 μm, aggregation might occur when mixing the particles with the resin, so that the intended effect is not attained. Meanwhile, when it exceeds 1 μm, an image having a higher gloss is hardly obtained.

The composition of the wax is not particularly limited unless the effect of this embodiment is impaired and it can properly be selected from known materials according to the purpose. Examples of the material thereof include a polyethylene resin and carnauba natural wax. It is advisable that wax having a melting point of at least 80° C. and at most 110° C. is added in an amount of at least 0.2% by weight and less than 8% by weight.

In this embodiment, with respect to the color toner receiving layer 11$c$, the temperature t at which the viscosity becomes $10^3$ Pa·s has to be from 90 to 120° C.

When it is less than 90° C., the heat resistance is poor, a problem such as blocking occurs when the layer is allowed to stand at a high temperature. Meanwhile, when it exceeds 120° C., no smooth image surface with a high gloss can be obtained by fixation. Especially, in the fixed image surface, there is a problem that a difference in height remains in an interface between a high-density area and a low-density area.

In this embodiment, the thickness of the color toner receiving layer 11$c$ is from 5 to 20 μm.

When it is less than 5 μm, no smooth image surface with a high gloss can be obtained by fixation. Especially, in the fixed image surface, there is a problem that a difference in height remains in an interface between a high-density area and a low-density area. Meanwhile, when it exceeds 20 μm, there is a problem that the color toner receiving layer 11$c$ is cracked when folded.

A method of mixing the resin, the inorganic fine particles and other additives forming the color toner receiving layer 11$c$ is not particularly limited so long as the purpose of uniformly dispersing the inorganic fine particles and other additives in the resin is attained, and a known mixing method can be used.

Examples thereof include a method in which a white pigment and other additives are incorporated into a molten resin using an extrusion-type kneader, and a method in which the resin, the inorganic fine particles, other additives and further a surfactant are charged into water, and dispersed and mixed by stirring at high speed. In view of uniformly dispersing the inorganic fine particles and other additives in the resin, melt mixing is preferable.

A method of forming the color toner receiving layer 11$c$ is not particularly limited so long as the purpose of forming the uniform, smooth color toner receiving layer 11$c$ is attained.

For example, a device based on a melt extrusion method in which the inorganic fine particles and other additives are also uniformly dispersed in the resin is mentioned.

The melt extrusion method includes a laminating method in which a molten resin film extruded from a heated extruder via a wide slit die (so-called T-die) is contacted with the light-scattering layer 11$b$ on the raw paper 11$a$ and continuously pressed with a roll and a general method in which a molten resin is extruded on a cooling roll and wound to form a film which is then laminated on the light scattering layer 11$b$ with a laminating unit.

The melt extrusion method can easily form a uniform film made of the resin, the inorganic fine particles and other additives on the light scattering layer 11$b$ formed on the raw paper 11$a$.

The extruder used to form the layer 11$c$ by the melt extrusion method may be a single screw extruder or a twin-screw extruder. In this case, it is important that the extruder has an ability to uniformly mix the resin with the fine particles and other additives. The water dispersion obtained by dispersing the resin, the inorganic fine particles and other additives in water can also be coated by a known method using a roll coater, a bar coater, a spin coater or the like.

The image supporting member 11 used in this embodiment can have the raw paper 11$a$, the light scattering layer 11$b$ and the color toner receiving layer 11$c$, and may further have other layers.

Figure 3B:
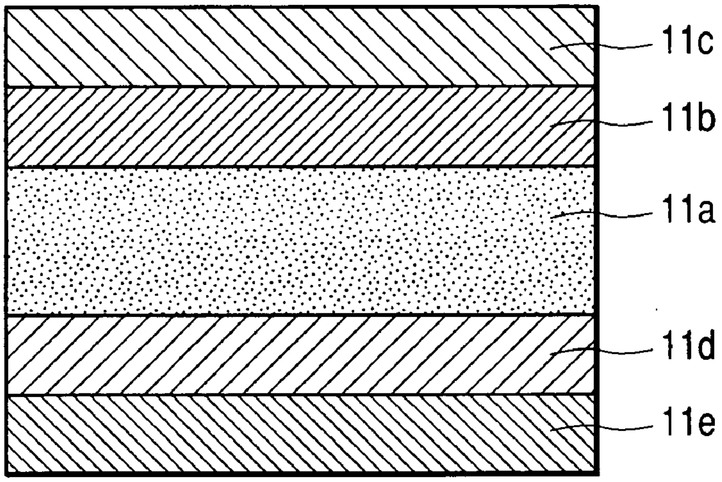
FIG. 3B and FIG. 3C are diagrammatic views showing cross-sectional structures of modified image supporting members used in embodiment 1.

For example, as shown in FIG. 3B, in the image supporting member 11, a reinforcing layer 11$d$ made of a polyethylene resin layer is formed on the back surface of the raw paper 11$a$, and an antistatic layer 11$e$ is further formed thereoutside.

According to this embodiment, such an image supporting member 11 has advantages that it can provide the image in which the whiteness is high, the top surface is smooth with the high gloss, show-through does not occur even in forming the image on the back surface and the vivid color is given with the smoothness and the good graininess and further that the transportability of the image supporting member 11 is good and dust is less adhered thereto.

The antistatic layer 11$e$ is formed for maintaining the surface resistivity of the back surface in the range of from $10^6$ to $10^{10}$ Ω/cm$^2$, and it is not particularly limited so long as this purpose is attained.

Examples thereof include a coating layer of colloidal silica, colloidal alumina or the like, a layer obtained by coating a mixture of particles of alumina, silica or the like and a small amount of a binder resin, and a layer obtained by coating a resin having dispersed therein an ionic surfactant.

Figure 3C:
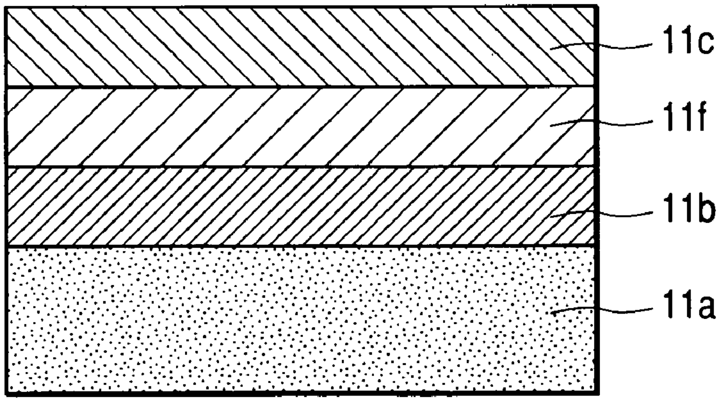

In the image supporting member 11, it is also preferable that, as shown in FIG. 3C, the gelatin layer 11$f$ is formed between the light scattering layer 11$b$ and the color toner receiving layer 11$c$.

This embodiment is effective for increasing an adhesion between the color toner receiving layer 11$c$ and the light scattering layer 11$b$. Especially when the color toner receiving layer 11$c$ is coated as a water dispersion of the constituent material, the gelatin layer 11*f* acts effectively to form the uniform color toner receiving layer 11*c*.

In this embodiment, the color toner is insulating particles containing at least the thermoplastic binder resin and the colorant. Examples thereof include a yellow toner, a magenta toner, a cyan toner and a black toner.

The binder resin can properly be selected according to the purpose. Examples thereof include known resins used for general toners, such as a polyester resin, a polystyrene resin, a polyacrylic resin, a vinyl resin, a polycarbonate resin, a polyamide resin, a polyimide resin, an epoxy resin and a polyurea resin, and copolymers thereof. Of these, a polyester resin or a styrene-acrylic copolymer resin are preferable because toner properties such as a low-temperature fixability, a fixing strength and a storage stability are satisfied at the same time. It is advisable that the binder resin has a weight average molecular weight of at least 5,000 and at most 40,000 and a glass transition temperature of at least 55 degree and less than 75 degree.

As the colorant, colorants generally used for formation of color images are available.

Dyes and pigments are both available. In view of a light fastness, pigment-type colorants are preferable. Examples of the colorant for Y (yellow) include Benzidine Yellow, Quinone Yellow and Hansa Yellow, examples of the colorant for M (magenta) include Rhodamine B, Rose Bengale and Pigment Red, examples of the colorant for C (cyan) include Phthalocyanine Blue, Aniline Blue and Pigment Blue, and Examples of the colorant for K (black) include carbon black, Aniline Black and a blend of color pigments.

For extending the range of color reproduction, it is important to control scattering at the interface between the pigment as the colorant and the binder. For example, a combination with a colorant in which a pigment having a small particle size is highly dispersed as shown in JP-A-4-242752 is available.

With respect to the amount of the colorant in the toner, spectral absorption characteristics and color reproducibility vary with the type of the colorant, and the optimum amount thereof also varies. It is advisable that the amount of the colorant is properly determined in the general range of from 3 to 10% by weight in consideration of the color reproduction range.

It is preferable that wax is added to the color toner.

The composition of the wax is not particularly limited unless the effect of the embodiment is impaired, and the wax can properly be selected from known materials used as the wax according to the purpose. Examples of the material thereof include a polyethylene resin and carnauba natural wax. It is advisable that wax having a melting point of at least 80° C. and at most 110° C. is added in an amount of at least 0.2% by weight and less than 8% by weight.

The particle size of the color toner is not particularly limited, and it is preferably at least 4 μm and at most 8 μm in view of obtaining an image good in graininess and gradation.

For obtaining the image good in graininess and tone reproducibility, it is required to control a fluidity and a chargeability of the toner. From this standpoint, it is preferable that the inorganic fine particles and/or the resin fine particles are externally added or adhered to the surface of the color toner.

The inorganic fine particles are not particularly limited unless the effect of the invention is impaired, and can properly be selected from known fine particles used as an external agent according to the purpose. Examples of the material thereof include silica, titanium dioxide, tinoxide and molybdenum oxide. In consideration of a stability of a chargeability or the like, the inorganic fine particles which are hydrophobized with a silane coupling agent, a titanium coupling agent or the like are also available.

The organic fine particles are not particularly limited unless the effect of this embodiment is impaired, and can properly be selected from known fine particles used as an external agent according to the purpose. Examples of the material thereof include a polyester resin, a polystyrene resin, a polyacrylic resin, a vinyl resin, a polycarbonate resin, a polyamide resin, a polyimide resin, an epoxy resin, a polyurea resin and a fluororesin.

The average particle size of the inorganic fine particles and the organic fine particles is preferably from 0.005 to 1 μm. When the average particle size is less than 0.005 μm, aggregation might occur when adhering the inorganic fine particles and/or the resin fine particles to the surface of the toner, so that the intended effect is not attained. Meanwhile, when it exceeds 1 μm, an image having a higher gloss is hardly obtained.

In the thermoplastic resin of the color toner image, it is preferable to use, as a main component, a polyester or styrene-acrylic resin, a temperature t at which the viscosity becomes $10^4$ Pa·s being t±10° C.

In this case, when the temperature t' at which the viscosity becomes $10^4$ Pa·s exceeds t+10° C. relative to the temperature at which the viscosity of the color toner receiving layer 11*c* becomes $10^3$ Pa·s, there is a problem that bubbles are formed in the vicinity of an image edge in an interface between a high-density solid image area having a large amount of a color toner image developed and a non-image area with no color toner image.

Meanwhile, when it is less than t−10° C., there might occur problems that the color toner image is disturbed in an intermediate-density image area to deteriorate graininess and a line is thickened or a character is collapsed.

The color toner is used as a developer in combination with a publicly known carrier which is properly selected. With respect to a monocomponent developer, a method in which a charged toner is formed by frictional charging with a developing sleeve or a charging member and subjected to development according to an electrostatic latent image.

In this embodiment, a known electrophotographic toner image forming device is used as the image forming unit 30.

For example, there is a device including a photoreceptor, a charging device opposite to the photoreceptor, an exposure device that exposes the photoreceptor, an image signal forming device that controls an image signal for forming a color image, a developing device opposite to the photoreceptor, and a transfer device that transfers a toner image of the photoreceptor onto the image supporting member 11.

There is also a device further including an intermediate transfer member, in which the toner image of the photoreceptor is once transferred onto the intermediate transfer member and the resulting toner image is transferred onto the image supporting member 11 from the intermediate transfer member by using a secondary transfer device.

In this case, the photoreceptor is not particularly limited, and a known photoreceptor is available. It may be a single layer structure or a functionally separated multilayer structure. The material may be an inorganic material such as selenium or amorphous silicon, or an organic material.

In the charging device, a method known per se can be used. Examples thereof include contact charging with a conductive or semiconductive roll, brush, film or rubber blade, and corotron charging or scorotron charging by using corona discharge.

In the exposure device, a known exposure device can be used. Examples thereof include a laser scanning device (ROS: Raster Output Scanner) having a semiconductor laser, a scanner and an optical system, and an LED head. In consideration of a desirable embodiment of forming a uniform exposure image having a high resolution, it is preferable to use ROS or a LED head.

As the image signal forming device, a known device can properly be used so long as signals are formed to develop the toner image on a desired position of the image supporting member 11.

As the developing device, a known developing device can be used regardless of a monocomponent development system or a two-component development system, so long as it can form a uniform toner image having a high resolution on the photoreceptor. A developing device of a two-component development system is preferable in view of enabling smooth tone reproduction with a good graininess.

As the transfer device (primary transfer device in a intermediate transfer type), a known device can be used. Examples thereof include a device in which an electric field is formed between the photoreceptor and the image supporting member 11 or the intermediate transfer member using a conductive or semiconductive roll, brush, film or rubber blade with a voltage applied to transfer the toner image made of charged toner particles, and a device in which the back surface of the image supporting member 11 or the intermediate transfer member is corona-charged with a corotron charging unit or a scorotron charging unit using corona discharge to transfer the toner image made of the charged toner particles.

As the intermediate transfer member, an insulating or semiconductive belt member or a drum-shaped member having an insulating or semiconductive surface can be used. A semiconductive belt member is preferable because a transferability can stably be maintained in continuous image formation and an apparatus can be downsized. As the belt member, a belt member made of a resin material having dispersed therein a conductive filler such as a carbon fiber is known. This resin is preferably a polyimide resin.

In the secondary transfer device, a known device can be used. Examples thereof include a device in which an electric field is formed between the intermediate transfer member and the image supporting member 11 using a conductive or semiconductive roll, brush, film or rubber blade with a voltage applied to transfer the toner image made of charged toner particles, and a device in which the back surface of the intermediate transfer member is corona-charged with a corotron charging unit or a scorotron charging unit using corona discharge to transfer the toner image made of the charged toner particles.

The fixing device 40 can properly be selected. Preferably, it includes a heat-pressing unit having a belt-shaped fixing member (fixing belt 41) by which the image on the image supporting member 11 is heat-pressed with the belt-shaped fixing member, and a cooling and separating unit that cools and separates the base material after heat-pressing.

In the belt-shaped fixing member here, a resin film such as polyimide, or a metallic film such as stainless steel can be used. Since a high heat resistance temperature and a good releasability are required, a heat-resistant base material laminated with a release layer is preferable. As the base material, it is preferable to use films of resins such as a polyimide resin and a polyethylene terephthalate resin and metallic belts such as a stainless steel belt. In the release layer, it is preferable to use a silicone rubber, a fluororubber, a fluororesin and the like.

In order to maintain a stable releasability and minimize contamination with dust or the like, it is preferable that a resistivity is adjusted by adding conductive additives such as conductive carbon particles and conductive polymers.

The fixing member may take the shape of a sheet, but it is preferable to use an endless belt-shaped member. In view of the smoothness, it is preferable that a gloss of the surface as measured with 75° gloss meter is 60 or more.

As the heat-pressing device, a known device can be used. For example, there is a device in which a belt-shaped fixing member and the image supporting member 11 having an image formed thereon are nipped and driven between a pair of rolls driven at a fixed rate.

In this case, the surface(s) of one or both of the rolls is (are) heated at a temperature of melting a color toner with, for example, a device having a heat source therein, and the two rolls are urged against each other. Preferably, a silicone rubber or fluororubber layer is formed on the surface(s) of one or both of the rolls, and a length of the nip portion of the two rolls is in the range of from 1 to 8 mm.

It is preferable that the surface temperature of the heating roll and the pressing roll in the fixation is controlled such that the viscosity of the color toner receiving layer 11*c* in the rear end (outlet side of the fixing nip portion) of the region against which the two rolls are urged becomes from $10^2$ to $10^4$ Pa·s.

As the cooling and separating device, there is a device in which the image supporting member 11 heat-pressed with the belt-shaped fixing member is cooled and then separated with a separating member.

At this time, the cooling may be spontaneous cooling. In view of the size of the device, it is preferable to increase the cooling rate with a cooling member such as a heat sink or a heat pipe. As the separating member, a member in which a separating nail is inserted between the belt-shaped fixing member and the image supporting member 11, or a member in which a roll (separating roll) having a small curvature is mounted in a separating position is preferable.

As a transporting device 50 that transports the image supporting member 11 to the fixing device 40, a transporting device known per se can be used.

At this time, it is advisable that the transporting rate is constant. For example, a device in which the image supporting member 11 is nipped and driven between a pair of rubber rolls rotated at a constant rotational speed, and a device in which a belt made of a rubber or the like is wound on a pair of rolls one of which is driven with a motor or the like at a constant rate and the image supporting member 11 is put on the belt and transported at a constant rate, can be used.

Especially when an unfixed toner image is formed, the latter device is preferable because the toner image is not disturbed.

The image forming apparatus shown in FIG. 2 is specifically described below.

In FIG. 2, in the image forming unit 30, a charging unit not shown, an exposure device 33 that forms an electrostatic latent image on a photosensitive drum 31 upon exposure-scanning an original 32, a rotary developing device 34 having developing units 34*a* to 34*d* in which yellow, magenta, cyan and black color toners are accommodated, an intermediate transfer belt 35 that temporarily holds the image transferred from the photosensitive drum 31 and a cleaning device, not shown, that cleans residual toners on the photosensitive drum 31 are mounted around the photo sensitive drum 31. A primary transfer device (for example, a transfer corotron) 36 is mounted in an opposite position of the intermediate transfer belt 35 to the photosensitive drum 31, and a secondary transfer device (in this example, a pair of a transfer roll 37*a* and a backup roll 37*b* that nip the intermediate transfer belt 35 and the image supporting member 11 are mounted) 37 is disposed in a position of the intermediate transfer belt 35 where the image supporting member 11 is passed.

In the exposure device 33, light from an illumination lamp 331 is applied to the original 32, reflected light from the original 32 is subjected to color separation with a color scanner 332, and image-processed with an image processor 333. Then, electrostatic latent image writing light is applied to an exposure point of the photosensitive drum 31 through, for example, a laser diode 334 and an optical system 335.

The fixing device 40 has a fixing belt (for example, a belt member whose surface is coated with a silicone rubber) hanged on plural (3 in this embodiment) tension rolls 42 to 44, a heating roll 42 which is the tension roll positioned at an inlet side of the fixing belt 41 and adapted for heating, a separating roll 44 which is the tension roll positioned at an outlet side of the fixing belt 41 and adapted for separating the image supporting member 11, a pressing roll (a heat source may be added as required) 46 which is mounted opposite to the heating roll 42 to nip and press the fixing belt 41, and a heat sink 47 as a cooling member which is disposed inside the fixing belt 41 for cooling the fixing belt 41 midway from the heating roll 42 to the separating roll 44.

The transporting device 50 formed of, for example, a transporting belt is mounted between the fixing device 40 and the image forming position of the image forming unit 30.

The operation of the image forming apparatus in this embodiment is described below.

When a color copy is obtained using the image forming apparatus according to this embodiment, as shown in FIG. 2, first, light from the illumination lamp 331 is applied to the original 32 to be copied, and the reflected light is subjected to color separation with the color scanner 332, and processed with the image processor 333 for color compensation. The resulting plural color toner image are converted to modified laser beams with a laser diode 334 according to respective colors.

The laser beams are applied to the photosensitive drum 31 plural times one by one according to the respective colors to form plural electrostatic latent images. These plural electrostatic latent images are developed using yellow, magenta, cyan and black four color toners in order with an yellow developing unit 34*a*, a magenta developing unit 34*b*, a cyan developing unit 34*c* and a black developing unit 34*d*.

The thus-developed color toner images 12 (refer to FIG. 4) are transferred in order from the photosensitive drum 31 to the intermediate transfer belt 35 with the primary transfer device (transfer corotron) 36, and the four color toner images 12 transferred on the intermediate transfer belt 35 are transferred on the image supporting member 11 at a time with the secondary transfer device 37.

Figure 4:
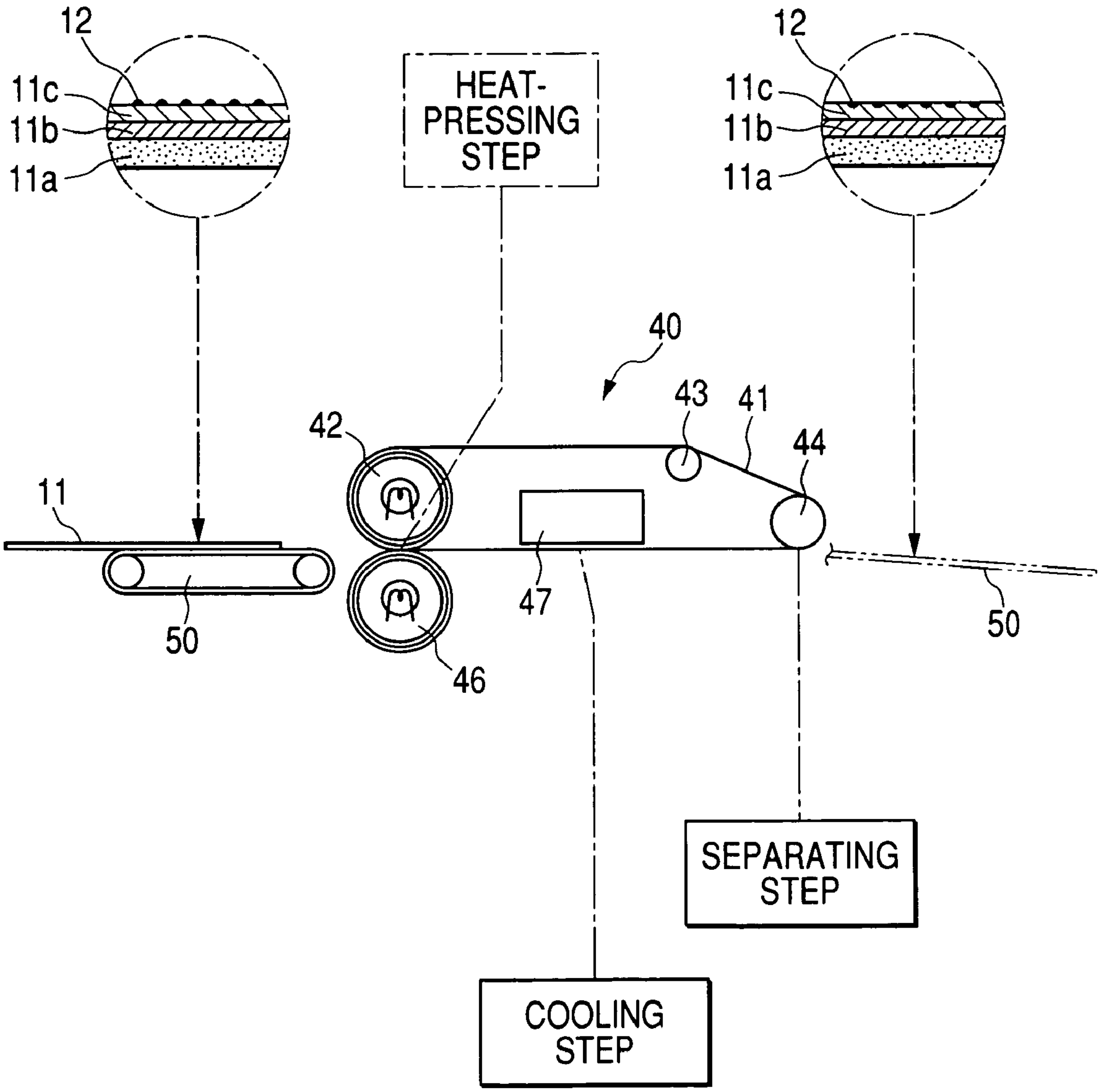
FIG. 4 is a diagrammatic view showing the step of fixing the image in embodiment 1.

Subsequently, the image supporting member 11 with the color toner images transferred is transported to the fixing device 40 via the transporting device 50 as shown in FIG. 4.

At this time, the color toner images 12 project by thickness of the image layer from the color toner receiving layer 11*c* of the image supporting member 11.

The operation of the fixing device 40 is described below. The heating roll 42 and the pressing roll 46 are both preheated to a toner melting temperature. For example, a load of 100 kgf is applied between the two rolls 42, 46. Further, the two rolls 42, 46 are rotatably driven, and the fixing belt 41 is also driven by the driving of these two rolls.

The fixing belt 41 is contacted with the surface of the image supporting member 11 with the color toner images 12 transported in a nip portion between the heating roll 42 and the pressing roll 46 to heat-melt the color toner images 12 (heat-pressing step).

At this time, since the melt characteristics of the light scattering layer 11*b*, the color toner receiving layer 11*c* and the color toner images 12 on the image supporting member 11 are selected in the preferable ranges, the color toner images 12 are completely embedded in the color toner receiving layer 11*c*, as shown in FIG. 4, and the surface form having a high smoothness on the fixing belt 41 is directly transferred on the color toner receiving layer 11*c* which is a surface portion of the image supporting member 11.

Then, the image supporting member 11 and the fixing belt 41 are transported to the separating roll 44 in an adhered state via the toner layer. During this time, the fixing belt 41, the color toner images 12 and the image supporting member 11 are cooled with the heat sink 47 (cooling step).

Consequently, when the image supporting member 11 reaches the separating roll 44, the color toner images 12 and the image supporting member 11 are integrally separated from the fixing belt 41 due to the curvature of the separating roll 44 (separating step).

In this manner, the smooth color images having the high gloss are formed on the image supporting member 11.

Such a performance is verified by the following Examples.

EXAMPLE 1

(Color Toner Developer)

A linear polyester obtained from terephthalic acid/bisphenol A ethylene oxide adduct/cyclohexanedimethanol (molar ratio=5:4:1, Tg=62° C., Mn=4,500, Mw=10,000) is used as a binder resin. 100 parts by weight of this binder resin is mixed with 5 parts by weight of Bendizine Yellow as a colorant of a yellow toner, 4 parts by weight of Pigment Red as a colorant of a magenta toner, 4 parts by weight of Phthalocyanine Blue as a colorant of a cyan toner and 5 parts by weight of carbon black as a colorant of a black toner respectively with a Banbury mixer by heat-melting. The mixture is pulverized with a jet mill, and then classified with a wind force classifier to obtain fine particles having d50 of 7 μm.

The following two types of inorganic fine particles A and B are adhered to 100 parts by weight of the foregoing fine particles with a high-speed mixer.

The inorganic fine particles A are $SiO_2$ (the surface is hydrophobized with a silane coupling agent; average particle size 0.05 μm, amount 1.0 part by weight). The inorganic fine particles B are $TiO_2$ (the surface is hydrophobized with a silane coupling agent; average particle size 0.02 m, refractive index 2.5, amount 1.0 part by weight).

The melting temperature t' of this toner is 105° C.

100 parts by weight of the same carrier as that of a black developer for A color 635 (manufactured by Fuji Xerox Co., Ltd.) and 8 parts by weight of this toner are mixed to prepare a two-component developer.

(Image Forming Apparatus)

The color image forming apparatus of FIG. 2 described above is used as the image forming apparatus.

The speed of the image forming process except the fixing step is 160 mm/s.

A weight ratio of the toner and the carrier, a charging potential of the photoreceptor, an amount of exposure and developing bias are adjusted such that the developing amount of each color toner in a solid image area becomes 0.7 ($mg/cm^2$)

(Image Supporting Member)

As the image supporting member 11, the member shown in FIG. 3B is used.

A paper made of a wooded pulp raw material and having a thickness of 150 μm is used as the raw paper 11*a*.

100 parts by weight of a polyethylene resin is mixed with 25 parts by weight of titanium dioxide (KA-10, manufactured by Titan Kogyo K.K., particle size from 300 to 500 nm), and the mixture is charged into a melt extruder heated at 200° C. The extrudate is jetted from a T-die, and laminated on the surface of the raw paper 11*a* subjected to flame treatment by being nipped between a nip roll and the cooling roll to prepare the light scattering layer 11*b* having a thickness of 30 μm. The both surfaces of the film after passed through the T-die are subjected to corona discharge treatment with a corona treatment device. In this light scattering layer 11*b*, T is 130° C. 8 parts by weight of hydrophobized silica fine particles (R-972 manufactured by Nippon Aerosil Co., Ltd.; particle size 16 nm) is added to 100 parts by weight of a resin made of an ethylene-acrylic acid copolymer (molar ratio=95:5), and the mixture is melt-kneaded with an extrusion-type kneader heated at 200° C. The resulting pellets are charged into a melt extruder heated at 200° C. The extrudate is jetted from a T-die, and laminated on the raw paper 11*a* having the light scattering layer 11*b* formed thereon by being nipped between the nip roll and the cooling roll to prepare the color toner receiving layer 11*c* having a thickness of 20 μm. In this color toner receiving layer 11*c*, T is 100° C.

A polyethylene resin is charged into a melt extruder heated at 200° C., jetted from a T-die, and laminated on the back surface of the raw paper 11*a* subjected to flame treatment by being nipped between the nip roll and the cooling roll to prepare the polyethylene layer 11*d* as a reinforcing layer having a thickness of 30 μm. The both surfaces of the film after passed through the T-die are subjected to corona discharge treatment with a corona treatment device. Colloidal silica as an antistatic agent is further coated thereon with a bar coater to prepare the antistatic layer 11*e*.

(Fixing Device)

As the fixing belt 41 of the fixing device 40, a belt obtained by coating KE 4895 silicone rubber (manufactured by Shin-etsu Chemical Industry Co., Ltd.) having a thickness of 50 μm on a polyimide film having a thickness of 80 μm in which conductive carbon fillers are dispersed is used.

As the heating roll 42 and the pressing roll 46, a roll obtained by forming a silicone rubber layer having a thickness of 2 mm on an aluminum core is used, and a halogen lamp is mounted as a heat source on the center of each roll. Both the temperatures of the surfaces of the rolls 42, 46 are changed in the range of from 100° C. to 170° C.

The fixing rate is set at 30 mm/s.

The temperature of the image supporting member 11 in the separating position is set at 70° C.

A portrait image is outputted with the foregoing apparatus.

The properties of the toner material used are measured as follows.

The molecular weight is measured by gel permeation chromatography. Tetrahydrofuran is used as a solvent.

The average particle size of the toner is measured with a Coulter counter, and a weight average, d50 is employed.

The viscosity of the resin is measured with a rotary plate-type rheometer (RDA II manufactured by Rheometric Sientific Inc.) at an angular speed of 1 (rad/s).

EXAMPLE 2

A color image is formed in the same manner as in Example 1 except that the color toner receiving layer 11*c* is changed as follows.

5 parts by weight of hydrophobized silica fine particles (R-972 manufactured by Nippon Aerosil Co., Ltd.; particle size 16 nm) is added to 100 parts by weight of a resin made of an ethylene-acrylic acid copolymer (molar ratio=87:13), and the mixture is melt-kneaded with an extrusion-type kneader heated at 20° C. The resulting pellets are charged into a melt extruder heated at 200° C. The extrudate is jetted from a T-die, and laminated on the raw paper 11*a* having the light scattering layer 11*b* formed thereon by being nipped between the nip roll and the cooling roll to prepare the color toner receiving layer 11*c* having a thickness of 20 μm. In this color toner receiving layer 11*c*, T is 90° C.

EXAMPLE 3

A color toner image is formed in the same manner as in Example 1 except that the color toner developer is changed as follows.

(Color Toner Developer)

A linear polyester obtained from terephthalic acid/bisphenol A ethylene oxide adduct/cyclohexanedimethanol (molar ratio=5:4:1, Tg=62° C., Mn=6,000, Mw=17,000) is used as a binder resin. 100 parts by weight of this binder resin is mixed with 5 parts by weight of Bendizine Yellow as a colorant of a yellow toner, 4 parts by weight of Pigment Red as a colorant of a magenta toner, 4 parts by weight of Phthalocyanine Blue as a colorant of a cyan toner and 5 parts by weight of carbon black as a colorant of a black toner respectively with a Banbury mixer by heat-melting. The mixture is pulverized with a jet mill, and then classified with a wind force classifier to obtain fine particles having d50 of 7 μm.

The following two types of inorganic fine additives A and B are adhered to 100 parts by weight of the foregoing fine particles with a high-speed mixer.

The inorganic fine particles A are $SiO_2$ (the surface is hydrophobized with a silane coupling agent; average particle size 0.05 μm, amount 1.0 part by weight). The inorganic fine particles B are $TiO_2$ (the surface is hydrophobized with a silane coupling agent; average particle size 0.02 μm, refractive index 2.5, amount 1.0 part by weight).

The melting temperature t' is 130° C.

100 parts by weight of the same carrier as that of a black developer for A color 635 (manufactured by Fuji Xerox Co., Ltd.) and 8 parts by weight of this toner are mixed to prepare a two-component developer.

EXAMPLE 4

A color image is formed in the same manner as in Example 1 except that the color toner developer is changed as follows.

(Color Toner Developer)

A linear polyester obtained from terephthalic acid/bisphenol A ethylene oxide adduct/cyclohexanedimethanol (molar ratio=5:4:1, Tg=62° C., Mn=3,000, Mw=7,500) is used as a binder resin. 100 parts by weight of this binder resin is mixed with 5 parts by weight of Bendizine Yellow as a colorant of a yellow toner, 4 parts by weight of Pigment Red as a colorant of a magenta toner, 4 parts by weight of Phthalocyanine Blue as a colorant of a cyan toner and 5 parts by weight of carbon black as a colorant of a black toner respectively with a Banbury mixer by heat-melting. The mixture is pulverized with a jet mill, and then classified with a wind force classifier to obtain fine particles having d50 of 7 μm.

The following two types of inorganic fine particles A and B are adhered to 100 parts by weight of the foregoing fine particles with a high-speed mixer.

The inorganic fine particles A are $SiO_2$ (the surface is hydrophobized with a silane coupling agent; average particle size 0.05 μm, amount 1.0 part by weight). The inorganic fine particles B are $TiO_2$ (the surface is hydrophobized with a silane coupling agent; average particle size 0.02 μm, refractive index 2.5, amount 1.0 part by weight).

The melting temperature t' is 90° C.

100 parts by weight of the same carrier as that of a black developer for A color 635 (manufactured by Fuji Xerox Co., Ltd.) and 8 parts by weight of this toner are mixed to prepare a two-component developer.

EXAMPLE 5

A color image is formed in the same manner as in Example 1 except that the antistatic layer 11*e* is not formed on the back surface of the image supporting member 11.

COMPARATIVE EXAMPLE 1

A color image is formed in the same manner as in Example 1 except that the image supporting member is changed as follows.

(Image Supporting Member)

The same light scattering layer as in Example 1 is formed on the same raw paper as in Example 1 in the same manner as in Example 1.

5 parts by weight of hydrophobized silica fine particles (R-972 manufactured by Nippon Aerosil Co., Ltd., particle size 16 nm) are added to 100 parts by weight of an ethylene-acrylic acid copolymer (molar ratio=85:15), and the mixture is melt-kneaded with an extrusion-type kneader heated at 200° C. The resulting pellets are charged into a melt extruder heated at 200° C. The extrudate is jetted from a T-die, and laminated on a raw paper having a light scattering layer formed thereon by being nipped between a nip roll and a cooling roll to prepare a color toner receiving layer having a thickness of 20 μm. The both surfaces of the film after passed through the T-die are subjected to corona discharge treatment with a corona treatment device. In this color toner receiving layer, t is 70° C.

A polyethylene resin is laminated on the back surface to a thickness of 30 μm, and colloidal silica is further coated thereon as an antistatic agent.

COMPARATIVE EXAMPLE 2

A color image is formed in the same manner as in Example 1 except that the image supporting member is changed as follows.

(Image Supporting Member)

As a raw paper, the same raw paper as in Example 1 is used.

100 parts by weight of a resin made of an ethylene-acrylic acid copolymer (molar ratio=95:5) is mixed with 20 parts by weight of titanium dioxide (KA-10, manufactured by Titan Kogyo K.K., size from 300 to 500 nm) through an extrusion-type kneader heated at 200° C., and the mixture is charged into a melt extruder heated at 200° C. The extrudate is jetted from a T-die, and laminated on the top surface of the raw paper subjected to flame treatment by being nipped between a nip roll and the cooling roll to prepare a light scattering layer having a thickness of 30 μm. In this light scattering layer, T is 100° C.

8 parts by weight of hydrophobized silica fine particles (R-972 manufactured by Nippon Aerosil Co., Ltd.; particle size 16 nm) is added to 100 parts by weight of a resin made of an ethylene-acrylic acid copolymer (molar ratio=80:20), and the mixture is melt-kneaded with an extrusion-type kneader heated at 200° C., and laminated on the light scattering layer to a thickness of 20 μm to form a color toner receiving layer having a thickness of 20 μm. In this color toner receiving layer, t is 105° C.

The same polyethylene resin layer and antistatic layer as in Example 1 are formed on the back surface of the raw paper.

COMPARATIVE EXAMPLE 3

A color image is formed in the same manner as in Example 1 except that the color toner receiving layer is not formed on the image supporting member.

COMPARATIVE EXAMPLE 4

A color image is formed with the same apparatus as in Example 1 except that the image supporting member is changed to J paper (manufactured by Fuji Xerox Co., Ltd.).

COMPARATIVE EXAMPLE 5

A color image is formed with the same apparatus as in Example 1 except that the image supporting member is changed to OK Toku Art Paper (manufactured by Oji Paper Co., Ltd.: 155 gsm).

(Evaluation of an Image)

(Mechanical Strength)

In Examples and Comparative Examples, the image obtained at the fixing temperature of 140° C. is wound on metallic rolls different in radius, and a minimum radius at which no cracking occurs is measured.

○: The radius is less than 10 mm.

Δ: The radius is at least 10 mm and less than 40 mm.

x: The radius is at least 40 mm.

(Heat Resistance)

In Examples and Comparative Examples, the images obtained at the fixing temperature of 140° C. are overlaid with the top surface and the back surface brought into contact, and are stored into a thermostatic chamber held at a constant temperature while a load of 30 $gw/cm^2$ is applied thereon. Three days later, the temperature is returned to room temperature of approximately 22° C., and the image surfaces are separated. This test is repeated while changing the temperature.

○: The temperature at which to destroy the image surfaces is at least 50° C.

Δ: This temperature is at least 40° C. and less than 50° C.

x: This temperature is less than 40° C.

(Low-temperature Fixability)

In the images obtained in Examples and Comparative Examples, the gloss of the blank area is measured with a 75° glossmeter (manufactured by Murakami Color Research Laboratory K.K.).

○: The fixing temperature at which the gloss is at least 90 is less than 130° C.

Δ: This fixing temperature is at least 130° C. and less than 150° C.

x: This fixing temperature is at least 150° C.

(Evaluation of Smoothness)

In the images obtained in Examples and Comparative Examples, the smoothness is visually observed.

○: The temperature range at which bubbles are not observed on the surface of the image is at least 20° C.

Δ: This temperature range is at least 10° C. and less than 20° C.

x: This temperature range is less than 10° C.

(Overall Image Quality)

In Examples and Comparative Examples, the overall quality of the image obtained at the fixing temperature of 140° C. is evaluated according to the following five grades.

quite preferable: 5 points preferable: 4 points common: 3 points unpreferable: 2 points quite unpreferable: 1 point There are 10 subjects.

○: The average of 10 subjects is at least 3.5 points.

Δ: This average is at least 2.5 points and less than 3.5 points.

x: This average is less than 2.5 points.

The results of the image evaluation in Examples 1 to 5 and Comparative Examples 1 to 5 are shown in FIG. 5.

In FIG. 5, Examples 1 to 5 provide the images that satisfy all of the mechanical strength, the heat resistance and the low-temperature fixability. Further, the overall image quality is high, and good images are obtained.

In the image of Example 3, small bubbles that can hardly be observed visually are generated in the interface having a great difference in image density, which is not problematic in evaluating the smoothness and the overall image quality.

Meanwhile, the image in Comparative Example 1 enables the fixation at a low temperature, but is very poor in heat resistance. Further, a lot of large bubbles having a size of approximately 1 mm are generated at the fixing temperature of 130° C. presumably because the color toner receiving layer is melted too soft. At the temperature of 130° C. or higher, the graininess is also deteriorated.

In the image of Comparative Example 2, small bubbles that can notably be observed visually occur in the interface having a great difference in image density at the fixing temperature of 140° C. or less. A number of large bubbles having a size of approximately 1 mm are observed at the fixing temperature of 145° C. or higher presumably because the light scattering layer and the color toner receiving layer are melted too soft. At the temperature of 130° C. or higher, the graininess is also deteriorated.

In the images of Comparative Examples 3 to 5, the overall image quality is unpreferable presumably because the graininess is poor.

In Comparative Example 3, the high gloss is obtained at the temperature of 140° C. or higher, but small bubbles can visually be observed in the interface having a great difference in image density, and a difference in height is great in this portion. These problems cannot be improved at 150° C. either. A number of large bubbles having a size of approximately 1 mm are generated at the temperature of 150° C. or higher presumably because the light scattering layer and the color toner receiving layer are melted too soft.

In Comparative Example 4, the color toner image is penetrated inside the image supporting member, and the graininess and the color reproducibility are also poor.

In Comparative Example 5, the background area cannot be made to have a high gloss. Further, a difference in height is great in the interface having a great difference in image density. These problems cannot be improved at 170° C. either. In the toner image area having a high density, a number of large bubbles having a size of approximately 1 mm are generated at the temperature of 160° C. or higher.

In view of the foregoing, Examples 1 to 5 can provide the image supporting member capable of obtaining the excellent image which satisfy all of the mechanical strength, the heat resistance and the low-temperature fixability and are excellent in overall image quality, and the image forming apparatus that forms such an excellent image.

As has been thus far described, the image supporting member according to the invention has the light scattering layer and the color toner receiving layer on the base material and improves the image fixability by adjusting the viscosity characteristics of the light scattering layer and the color toner receiving layer. Accordingly, the high gloss is uniformly provided on the whole surface of the image as in the silver halide photograph, and the heat resistance, the mechanical strength and the low-temperature fixability by the fixing device with the small amount of energy consumption can easily be satisfied.

In the image forming apparatus using such an image supporting member, the fixing device with the small amount of energy consumption can be used, and the high-quality image can easily be formed at low cost.

What is claimed is:

1. An image supporting member that fixable supports a color toner image containing at least a thermoplastic resin and a colorant, the image supporting member comprising:
- a base material;
- a light scattering layer formed on a first surface of the base material and containing a white pigment and a thermoplastic resin; and
- a color toner receiving layer formed on the light scattering layer and containing at least a thermoplastic resin,
- wherein the thermoplastic resin of the light scattering layer is made of a polyolefin or a polyolefin copolymer, a temperature T at which the melt viscosity becomes $5\times10^3$ Pa·s being 120° C. or higher, and
- the thermoplastic resin of the color toner receiving layer is a polyolefin copolymer, a temperature t at which the melt viscosity becomes $10^3$ Pa·s being from 90 to 120° C.

2. The image supporting member according to claim 1, wherein the base material is a raw paper whose basis weight is from 100 to 250 gsm.

3. The image supporting member according to claim 1, wherein the light scattering layer contains from 20 to 40% by weight of a white pigment.

4. The image supporting member according to claim 1, wherein the thickness of the light scattering layer is from 20 to 50 μm.

5. The image supporting member according to claim 1, wherein the color toner receiving layer contains at least 80% by weight of the thermoplastic resin.

6. The image supporting member according to claim 1, wherein the thickness of the color toner receiving layer is from 5 to 20 μm.

7. The image supporting member according to claim 1, wherein the polyolefin copolymer is an ethylene-acrylic acid or ethylene-acrylic ester copolymer, and a copolymerization ratio of acrylic acid or an acrylic acid ester is from 4 to 10 mol %.

8. The image supporting member according to claim 1, wherein the color toner receiving layer contains from 3 to 15% by weight of inorganic fine particles.

9. The image supporting member according to claim 8, wherein the inorganic fine particles are titanium dioxide or silica having a size of from 8 to 200 nm.

10. The image supporting member according to claim 1, wherein a reinforcing layer made of a polyolefin or a polyolefin copolymer is formed on a second surface of the base material.

11. The image supporting member according to claim 1, wherein an antistatic layer is formed on at least one of the first and second surface of the base material.

12. The image supporting member according to claim 1, wherein a gelatin layer is formed between the light scattering layer and the color toner receiving layer.

13. The image supporting member according to claim 1, wherein in the thermoplastic resin of the color toner image, a polyester or styrene-acrylic resin, a temperature t' at which the melt viscosity becomes $10^4$ Pa·s being t±10° C., is used as a main component.

14. An image forming apparatus comprising:

an image supporting member that fixable supports a color toner image containing at least a thermoplastic resin and a colorant;

an image forming unit that forms the color toner image on the image supporting member; and a fixing device that fixes the color toner image formed by the image forming unit on the image supporting member, wherein the image supporting member includes:

a base material;

a light scattering layer formed on the base material and containing a white pigment and a thermoplastic resin; and a color toner receiving layer formed on the light scattering layer and containing at least a thermoplastic resin, the thermoplastic resin of the light scattering layer is made of a polyolefin or a polyolefin copolymer, a temperature T at which the melt viscosity becomes $5\times10^3$ Pa·s being 120° C. or higher, and the thermoplastic resin of the color toner receiving layer is a polyolefin copolymer, a temperature t at which the melt viscosity becomes $10^3$ Pa·s being from 90 to 120° C.

15. The image forming apparatus according to claim 14, wherein the fixing device comprises a fixing member that nips and adheres the image of the image supporting member, a heat-pressing unit that heat-presses the color toner image on the image supporting member and a cooling and separating unit that cools the heat-pressed color toner image and separates the image from the fixing member.

* * * * *